G. D. HUTCHINSON.
AUTOMOBILE EMERGENCY TREAD.
APPLICATION FILED JUNE 9, 1915.
1,198,552.
Patented Sept. 19, 1916.
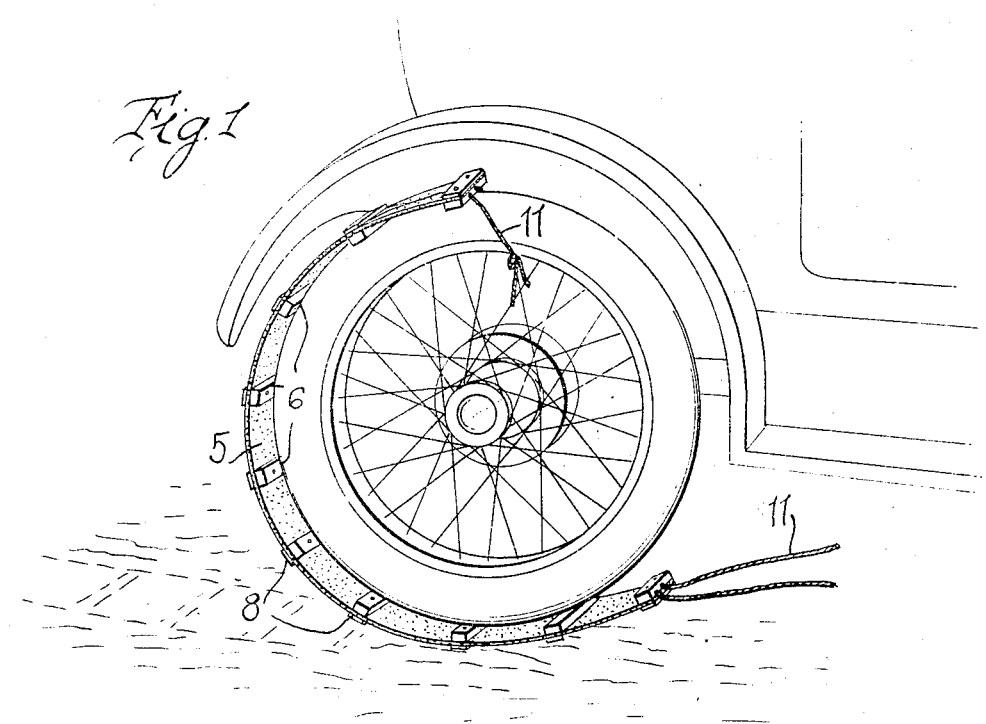
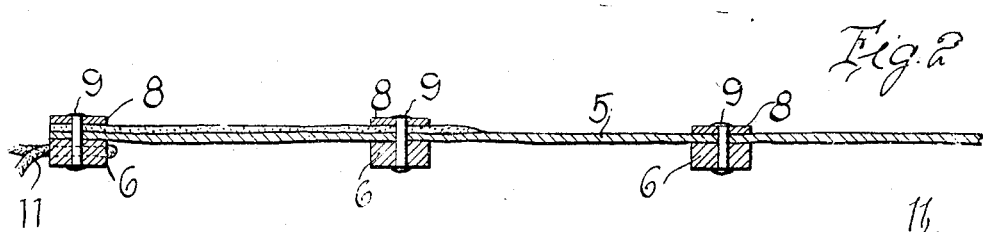
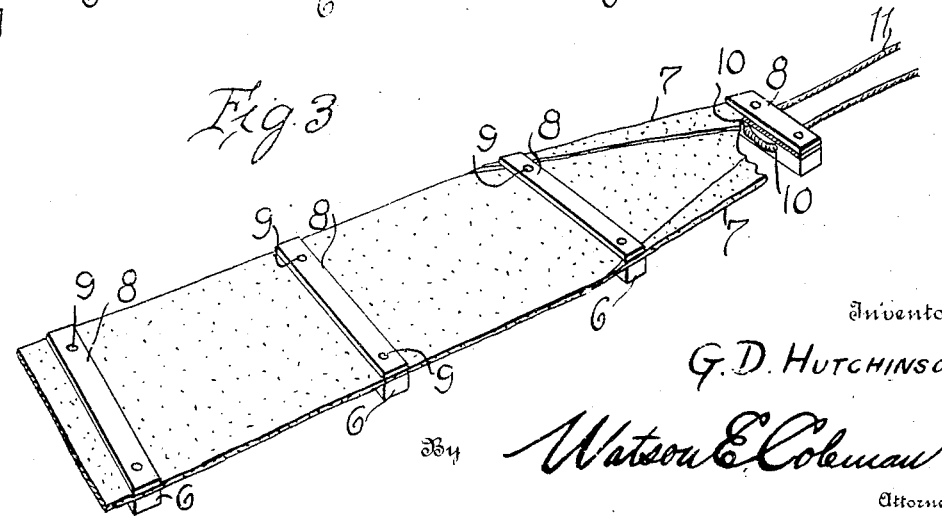
Inventor
G. D. Hutchinson
By Watson E. Coleman
Attorney

UNITED STATES PATENT OFFICE.

GRANT D. HUTCHINSON, OF PAVILION, NEW YORK.

AUTOMOBILE EMERGENCY-TREAD.

1,198,552.   Specification of Letters Patent.   Patented Sept. 19, 1916.

Application filed June 9, 1915. Serial No. 33,125.

*To all whom it may concern:*

Be it known that I, GRANT D. HUTCHINSON, a citizen of the United States, residing at Pavilion, in the county of Genesee and State of New York, have invented certain new and useful Improvements in Automobile Emergency-Treads, of which the following is a specification, reference being had to the accompanying drawings.

This invention relates to an improved automobile emergency tread and has for its primary object to provide simple and effective means for application to the wheel of an automobile whereby the necessary tractive force upon the road surface may be obtained in order that the machine may be expeditiously moved or propelled when stalled in sandy or muddy stretches of the road.

The invention has for another object to provide a device for the above purpose embodying a flexible track having a series of rigid wheel gripping cleats secured thereon at intervals, and means connected to the end cleats for conveniently attaching the flexible track to the wheel of the vehicle.

The invention has for a further general object to improve and simplify the construction of devices of the above character, render the same strong and durable in practical use and highly serviceable and convenient and capable of manufacture at relatively small cost.

With the above and other objects in view, my invention consists in the novel features of construction, combination, and arrangement of parts to be hereinafter more fully described, claimed, and illustrated in the accompanying drawing, in which, Figure 1 is a perspective view illustrating the manner of applying the invention to the vehicle wheel; Fig. 2 is an enlarged longitudinal section; and Fig. 3 is a detail perspective view of one end of the flexible track.

Referring in detail to the drawing, 5 designates a multiple ply canvas or cotton belting which constitutes the body of the flexible track. Upon one side of this canvas belt, a plurality of spaced wood bars or cleats 6 are arranged extending across the entire width of the belt, the opposite longitudinal edge portions of the belt at the ends thereof being folded over upon oblique lines, as indicated at 7, so that the end portions of the belt or flexible track gradually decrease or taper in width to their extremities. Upon the opposite side of the belt with relation to the wood cleats 6, the spaced metal bars 8 are arranged. The bars 8 and the cleats 6 are permanently and rigidly fixed to the flexible length of belting by means of rivets, indicated at 9.

The relatively short end cleats 6 are provided with spaced openings 10 to receive the tie cords 11. The cord is passed through one of these openings, then extended along the inner face of the cleat and drawn outwardly through the other opening 10 therein, as clearly shown in Fig. 3 of the drawing.

In the use of the invention, assuming that the automobile has become stalled in a sandy or muddy stretch of the road so that the rear driving wheels cannot obtain a tractive purchase upon the road surface, one end of my improved flexible track is disposed in front of the rear wheel as close to the wheel tire or shoe thereon as possible, and the tie cord 11 is passed around the wheel rim and felly and tied thereto. The car is now started so that the flexible track is pulled by the wheel as it revolves, it being understood that the wooden cleats 6 are in engagement with the wheel tire. When the wheel has made one revolution, the tie cord 11 at the other end of the flexible track is also tied to the wheel. As soon as the car has moved beyond the sandy or muddy stretch of the road and is again upon firm ground, the car is stopped and the flexible track removed from the wheel. In this manner, it will be seen that the necessary traction to effect a forward movement of the machine when the same becomes stalled, may be readily obtained, and the device very easily and quickly attached to the wheel or removed therefrom. Any desired number of the wood cleats 6 and metal straps 8 may be employed and the length of flexible belting constituting the body of the track can be of any desired length or width.

From the foregoing description, taken in connection with the accompanying drawing, the construction, manner of use and several advantages of the invention will be readily understood. The device is quite simple in its construction, but capable of withstanding the severe usage to which such a device will be subjected. After using the flexible track, the same may be compactly rolled and stored in the rear of the body. The canvas belting can be very easily cleaned or scoured.

While I have shown and described the preferred construction and arrangement of the several elements constituting the invention, it will, nevertheless, be understood that the device is susceptible of considerable modification and I, therefore, reserve the privilege of resorting to all such legitimate changes as may be fairly embodied within the spirit and scope of the invention as claimed.

Having thus fully described my invention, what I desire to claim and secure by Letters Patent is:—

1. An emergency tread for vehicle wheels comprising a length of flexible material, spaced rectangular cleats arranged upon one side of the material and extending entirely across the same and adapted for engagement upon the periphery of the wheel tire, ground engaging metal straps arranged upon the other side of the material in opposed relation to said cleats, and rivets passing through the straps and the cleats and permanently securing the same to the material.

2. An emergency tread for vehicle wheels comprising a length of flexible material having its longitudinal edges at opposite ends turned inwardly and providing reinforcements therefor, spaced tire engaging cleats arranged upon the opposite side of the length of material with respect to the inturned edge portions thereof, metal ground engaging bars disposed upon the reverse side of the material in opposed relation to the cleats, a common securing means for the cleats and said metal bars, and means connected to the end cleats to attach the tread to a vehicle wheel.

In testimony whereof I hereunto affix my signature in the presence of two witnesses.

GRANT D. HUTCHINSON.

Witnesses:
R. F. TRESCOTT,
R. C. SHUMWAY.